US005705541A

United States Patent [19]
Awe et al.

[11] Patent Number: 5,705,541
[45] Date of Patent: Jan. 6, 1998

[54] HIGH GLOSS MOLDED ARTICLES OF CURABLE EPOXY RESIN COMPOSITION COMPRISING FILLERS

[75] Inventors: Jens Awe, Weil am Rhein; Helmut Beer, Reichelsheim; Wilhelm Endlich, Heppenheim, all of Germany

[73] Assignee: Ciba Specialty Chemicals Corporation, Tarrytown, N.Y.

[21] Appl. No.: 647,077

[22] Filed: May 8, 1996

Related U.S. Application Data

[63] Continuation of Ser. No. 272,717, Jul. 8, 1994, abandoned.

[30] Foreign Application Priority Data

Jul. 9, 1993 [CH] Switzerland ................ 2066/93

[51] Int. Cl.⁶ .................. C08K 3/36; C08K 3/34; C08L 63/00
[52] U.S. Cl. .................. 523/220; 523/443
[58] Field of Search .................. 523/443, 220

[56] References Cited

U.S. PATENT DOCUMENTS

| 4,401,776 | 8/1983 | Munk | 523/443 |
|---|---|---|---|
| 4,490,492 | 12/1984 | Skuldeny | 523/443 |
| 5,049,596 | 9/1991 | Rujimoto | 523/443 |
| 5,064,881 | 11/1991 | Togashi | 523/443 |
| 5,120,775 | 6/1992 | Vanzegbroeck | 523/443 |

FOREIGN PATENT DOCUMENTS

| 0244996 | 11/1987 | European Pat. Off. |
| 2810773 | 9/1979 | Germany |
| 4119034 | 12/1992 | Germany |

OTHER PUBLICATIONS

C. Orr, "Size Measurement of Particles", *Kirk–Othmer Encyl. of Chem. Tech.*, 21st ed., John Wiley & Sims, New York, vol. 21, pp. 107–131 (1983).

*Hawley's Condensed Chemical Dictionary*, 12th Ed., Van Nostrand Reinhold Co., New York, p. 668 (1993).

Lee, et al., "Handbook of Epoxy Resins", McGraw-Hill Book Co., New York pp. 4/59 and 14/5 (1982 Reissue).

Derwent Abst. 92–424942 [52].

Derwent Abst. 79–70170B [39].

*Primary Examiner*—Donald R. Wilson
*Attorney, Agent, or Firm*—David R. Crichton

[57] ABSTRACT

Molded articles having a high gloss comprising
(a) an epoxy resin having on average more than one epoxide group in the molecule,
(b) an epoxy resin curing agent in an amount sufficient for full curing of the epoxy resin,
(c) wollastonite having an average particle size of less than 50 μm in an amount of 10 to 350 parts by weight per 100 parts by weight of the sum of components (a) and (b),
(d) a quartz/kaolinite mixture having an average particle size of less than 100 μm in an amount of 10 to 350 parts by weight per 50 parts by weight of the sum of components (a) and (b), the content of components (c) and (d) together not being greater than 360 parts by weight, and, if appropriate,
(e) customary additives.

8 Claims, No Drawings

HIGH GLOSS MOLDED ARTICLES OF CURABLE EPOXY RESIN COMPOSITION COMPRISING FILLERS

This application is a continuation of application Ser. No. 08/272,717, filed Jul. 8, 1994, now abandoned.

The present invention relates to a curable epoxy resin composition comprising wollastonite and a quartz/kaolinite mixture, which is suitable for the production of mouldings having high-gloss surfaces.

It is known to add fillers to curable epoxy resin compositions in order to obtain moulded materials therefrom which have improved mechanical properties. For production of mouldings with high-gloss properties from synthetic resin compositions, it is desirable for the mouldings also to have good mechanical and good thermal properties, in addition to a high-gloss surface.

To increase the surface gloss of mouldings, epoxy resins have hitherto merely been applied in the form of powder coatings to existing surfaces, onto which a metal has then been vapour-deposited. Such a process is described, for example, in EP-A-0 244 996.

It has now been found that if curable epoxy resin compositions filled with wollastonite and a quartz/kaolinite mixture are used, moulded materials or coatings having both good mechanical properties and high-gloss surfaces onto which metals can be vapour-deposited directly are obtained by curing.

The present invention thus relates to a curable epoxy resin composition comprising (a) an epoxy resin having on average more than one epoxide group in the molecule, (b) an epoxy resin curing agent in an amount sufficient for full curing of the epoxy resin, (c) wollastonite having an average particle size of less than 100 µm in an amount of 10 to 350 parts by weight per 100 parts by weight of the sum of components (a) and (b), (d) a quartz/kaolinite mixture having an average particle size of less than 100 µm in an amount of 10 to 350 parts by weight per 100 parts by weight of the sum of components (a) and (b), the content of components (c) and (d) together not being greater than 360 parts by weight, and, if appropriate, (e) customary additives.

The epoxy resins customary in the epoxy resin industry can be used as epoxy resin (a) for the preparation of the epoxy resin compositions according to the invention. Examples of epoxy resins are:

I) Polyglycidyl and poly(β-methylglycidyl)esters obtainable by reaction of a compound having at least two carboxyl groups in the molecule and epichlorohydrin or β-methylepichlorohydrin. The reaction is advantageously carried out in the presence of bases.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic add or dimerized or trimerized linoleic acid. However, it is also possible to employ cycloaliphatic polycarboxylic acids, for example tetrahydrophthalic acid, 4-methyltetrahydrophthalic acid, hexahydrophthalic acid or 4-methylhexahydrophthalic acid.

Aromatic polycarboxylic acids, for example phthalic acid, isophthalic acid or terephthalic acid, can furthermore be used.

II) Polyglycidyl or poly(β-methylglycidyl)ethers obtainable by reaction of a compound having at least two free alcoholic hydroxyl groups and/or phenolic hydroxyl groups and epichlorohydrin or β-methylepichlorohydrin under alkaline conditions or in the presence of an acid catalyst with subsequent treatment with an alkali.

The glycidyl ethers of this type are derived, for example, from acyclic alcohols, such as from ethylene glycol, diethylene glycol and higher poly(oxyethylene) glycols, propanediol-1,2 or poly(oxypropylene) glycols, propane-1,3-diol, 1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol and from polyepichlorohydrins. However, they are also derived, for example, from cycloaliphatic alcohols, such as 1,4-cyclohexanedimethanol, bis(4-hydroxycyclohexyl)methane or 2,2-bis(4-hydroxycyclohexyl)propane, or they have aromatic nuclei, such as N,N-bis(2-hydroxyethyl)aniline or p,p'-bis(2-hydroxyethylamino)diphenylmethane. The glycidyl ethers can also be derived from mononuclear phenols, for example from resorcinol or hydroquinone, or they are based on polynuclear phenols, such as, for example, bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane and 2,2-bis(3,5-dibromo-4-hydroxyphenyl)propane, and from novolaks obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$ alkyl groups, such as, for example, 4-chlorophenol, 2-methylphenol or 4-tert-butylphenol, or by condensation with bisphenols such as those of the type as defined above.

III) Poly(N-glycidyl) compounds obtainable by dehydrochlorination of the reaction products of epichlorohydrin with amines which have at least two amine hydrogen atoms. These amines are, for example, aniline, n-butylamine, bis(4-aminophenyl)methane, m-xylylenediamine or bis(4-methylaminophenyl)methane.

However, the poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Cycloaliphatic epoxy resins, for example bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate.

However, epoxy resins in which the 1,2-epoxide groups are bonded to different heteroatoms or functional groups can also be used; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

An aromatic epoxy resin, i.e. an epoxy compound which contains one or more aromatic rings in the molecule, is preferably used for the preparation of the epoxy resin compositions according to the invention.

In particular, a bisphenol diglycidyl ether or an epoxynovolak resin, particularly preferably an epoxyphenol- or an epoxycresol-novolak resin, is used for the preparation of the epoxy resin compositions according to the invention.

The curing agents customary in the epoxy resin industry, for example polycarboxylic acids and anhydrides thereof, dicyandiamide, polyamines, polyaminoamides, adducts containing amino groups, aliphatic or aromatic polyols or curing agents having a catalytic action, can be employed as the epoxy resin curing agent (b) for the epoxy resin compositions according to the invention.

Suitable polycarboxylic acids for curing the epoxy resin compositions according to the invention are, for example, aliphatic polycarboxylic acids, such as maleic acid, oxalic acid, succinic acid, nonyl- or dodecylsuccinic acid, glutaric acid, adipic acid, pimelic acid, suberic acid, azelaic acid or dimerized or trimerized linoleic acid, cycloaliphatic polycarboxylic acids, such as, for example, tetrahydrophthalic acid, methylendomethylenetetrahydrophthalic acid, hexachloroendomethylenetetrahydrophthalic acid, 4-methyltetrahydrophthalic acid, hexahydrophthalic acid or 4-methylhexahydrophthalic acid, or aromatic polycarboxylic acids, such as, for example, phthalic acid, isophthalic acid, terephthalic acid, trimellitic acid, pyromellitic acid or benzophenone-3,3',4,4'-tetracarboxylic acid, and the anhydrides of the polycarboxylic acids mentioned.

Polyamines which can be employed for curing the abovementioned epoxy resin compositions are aliphatic, cycloaliphatic, aromatic or heterocyclic amines, such as, for example, ethylenediamine, propane-1,2-diamine, propane-1,3-diamine, N,N-diethylethylenediamine, hexamethylenediamine, diethylenetriamine, triethylenetetramine, tetraethylenepentamine, N-(2-hydroxyethyl)-, N-(2-hydroxypropyl)- and N-(2-cyanoethyl)diethyltriamine, 2,2,4-trimethylhexane-1,6-diamine, 2,3,3,-trimethylhexane-1,6-diamine, N,N-dimethyl- and N,N-diethylpropane-1,3-diamine, ethanolamine, m- and p-phenylenediamine, bis(4-aminophenyl)methane, aniline-formaldehyde resin, bis(4-aminophenyl) sulfone, m-xylylenediamine, bis(4-aminocyclohexyl)methane, 2,2-bis(4-aminocyclohexyl) propane, 2,2-bis(4-amino-3-methylcyclohexyl)propane, 3-aminomethyl-3,5,5-trimethylcyclohexylamine (isophoronediamine) and N-(2-aminoethyl)piperazine.

Suitable polyaminoamides for curing the abovementioned epoxy resin compositions are, for example, the reaction products obtained by reaction of polycarboxylic acids, preferably of di- or trimerized fatty acids, with polyamines, preferably aliphatic polyamines, in a molar excess, such as are described, for example, in Handbook of Epoxy Resins, 1967, pages 10–2 to 10–10 by H. Lee and K. Neville.

Amino group-containing adducts which are obtained from an amine and a polyepoxy compound and which function as curing agents for epoxy resins are also known and can be employed for curing the abovementioned epoxy resin compositions, and are obtained, for example, by reaction of epoxy resins with polyamines in an equivalent excess. Such amino group-containing adducts are described in more detail, for example, in U.S. Pat. Nos. 3,538,184; 4,330,659; 4,500,582 and 4,540,750.

Suitable aliphatic polyols for curing the abovementioned epoxy resin compositions are, for example, ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol.

Aromatic polyols which can be employed for curing the abovementioned epoxy resin compositions are, for example, mononuclear phenols, such as resorcinol, hydroquinone or N-N-bis(2-hydroxyethyl)aniline, or polynuclear phenols, such as p,p'-bis(2-hydroxyethylamino)diphenylmethane, bis (4-hydroxyphenyl)methane, 4,4'-dihydroxybiphenyl, bis(4-hydroxyphenyl) sulfone, 1,1,2,2-tetrakis(4-hydroxyphenyl) ethane, 2,2-bis(4-hydroxyphenyl)propane and 2,2-bis(3,5-dibromo-4-hydroxyphenyl)propane, and novolaks obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$ alkyl groups, such as, for example, 4-chlorophenol, 2-methylphenol or 4-tert-butylphenol, or by condensation with bisphenols, such as those of the type defined above.

It is also possible to use curing agents having a catalytic action for curing the epoxy resin compositions, such as tertiary amines, for example 2,4,6-tris(dimethylaminoethyl) phenol and other Mannich bases, N-benzyldimethylamine and triethanolamine; alkali metal alkoxides of alcohols, for example the sodium alcoholate of 2,4-dihydroxy-3-hydroxymethylpentane; tin salts of alkanoic acids, for example tin octanoate; and Friedel-Crafts catalysts, for example boron trifluoride and its complexes and chelates which are obtained by reaction of boron trifluoride with, for example, 1,3-diketones.

A phenolic epoxy resin curing agent is preferably used as curing agent (b) for the epoxy resin compositions according to the invention.

In particular, a cresol novolak is employed as curing agent (b).

Suitable curing accelerators can also be employed with the epoxy resin curing agents. For example, if dicyandiamide, polyaminoamides or polycarboxylic acids and anhydrides thereof are used, tertiary amines or salts thereof, quaternary ammonium compounds or alkali metal alkoxides can be used as accelerators.

The amount of curing agent employed depends on the chemical nature of the curing agent and on the desired properties of the curable composition and of the cured product. The maximum amount can easily be determined. If the curing agent is an mine, 0.75 to 1.25 equivalents of amine hydrogen per 1 epoxy equivalent are usually employed. If polycarboxylic acids or anhydrides thereof are employed, 0.4 to 1.1 equivalents of a carboxyl group or of an anhydride group per 1 epoxy equivalent are usually used. If polyphenols are used as the curing agent, 0.75 to 1.25 phenolic hydroxyl groups per 1 epoxy equivalent are employed. Curing agents having a catalytic action are in general employed in amounts of 1 to 40 parts by weight per 100 pans by weight of epoxy resin.

The wollastonite used as component (c) in the epoxy resin compositions according to the invention is a naturally occurring calcium silicate of the formula $Ca_3[Si_3O_9]$ of needle-shaped structure having particle sizes in the micron range. Wollastonite which can be prepared synthetically also has a needle-shaped structure. Wollastonite is commercially obtainable, for example under the name Nyad® from Nyco.

The epoxy resin compositions according to the invention preferably comprise wollastonite having an average particle size of less than 50 μm, in particular having an average particle size of less than 5 μm. Average particle size for the wollastonite is based on an equivalent spherical diameter by weight as determined by a sedigraph.

The epoxy resin compositions according to the invention furthermore comprise wollastonite in an amount of 50 to 200 parts by weight per 100 parts by weight of the sum of components (a) and (b).

The quartz/kaolinite mixture to be used as component (d) in the epoxy resin compositions according to the invention is likewise known and can be prepared, for example, by simply mixing ground quartz with kaolinite. Kaolinite, one of the main constituents of kaolin, is commercially obtainable as microcrystalline aluminium silicate.

The epoxy resin compositions according to the invention preferably comprise a quartz/kaolinite mixture in an mount of 50 to 200 parts by weight per 100 parts by weight of the sum of components (a) and (b).

The epoxy resin compositions according to the invention furthermore comprise a quartz/kaolinite mixture which preferably consists of 5 to 95 parts by weight of quartz and 95 to 5 parts by weight of kaolinite, in particular of 20 to 80 parts by weight of quartz and 80 to 20 parts by weight of kaolinite, per 100 parts by weight of the mixture.

The quartz/kaolinite mixture which the epoxy resin compositions according to the invention comprise preferably has an average particle size of less than 50 µm, in particular less than 5 µm. Average particle size for the quartz/kaolinite mixture is based on an equivalent spherical diameter by number as determined by the Fraunhofer diffraction method.

The epoxy resin compositions according to the invention can comprise, as customary additives (e), other customary fillers, such as glass powder or metal powder, dyes, pigments, such as titanium dioxide, processing auxiliaries, such as lubricants, flow control agents, thixotropic agents, stabilizers, adhesion promoters between fillers and resin, curing accelerators or mould release agents.

If other customary fillers are added to the epoxy resin compositions according to the invention, filers (c) and (d) to be used according to the invention make up at least two thirds, preferably at least three quarters, of the total amount of filler.

The epoxy resin compositions according to the invention are prepared by methods known per se, such as with the aid of known mixing units, for example stirrers, kneaders, rollers or, in the case of solid substances, in dry mixers.

Curing of the epoxy resin compositions according to the invention to give shaped articles, coatings or the like is carded out in the manner customary in the epoxy resin industry by heating, such as is described, for example, in "Handbook of Epoxy Resins", 1967, by H. Lee and K.Neville. The curing temperature is in general between 50° and 200° C.

The epoxy resin compositions according to the invention are suitable, for example, as casting resins, laminating resins, adhesives, compression moulding compositions, coating compositions and covering systems for electrical and electronic components, preferably for the production of shaped articles or coatings having many surfaces, such as, for example, headlamps. The shaped articles produced from the epoxy resin compositions according to the invention have smooth surfaces, so that, on the basis of the good surface nature, they can be provided directly with a metal coating, for example by vapour deposition of aluminium.

The present invention therefore also relates to the use of the epoxy resin composition according to the invention for the production of moulded materials having high-gloss surfaces.

The moulded materials or coatings produced from the epoxy resin compositions according to the invention furthermore are distinguished by a high heat stability. For example, these can be heated up to about 240° C. or even to higher temperatures over a relatively long period of time without distortion phenomena occurring on the moulded materials or coatings. The moulded materials or coatings produced from the epoxy resin compositions according to the invention thus have a low expansion difference within the moulding on heating. The low occurrence of gas evolution phenomena at elevated temperature, for example up to about 240° C. or at even higher temperatures, is also advantageous in the moulded materials produced from the epoxy resin compositions according to the invention.

EXAMPLE 20.73 g of a solid, ground epoxycresol-novolak resin having an epoxy value of 4.0–4.4 equivalents/kg; 10.07 g of a phenol-novolak having a hydroxyl value of 8.0–9.0 equivalents/kg, obtainable from Occidental Chem., Belgium under the tradename Durex® 33009; 35.26 g of wollastonite having an average particle size of 2.8 µm, obtainable from Nyco, USA under the tradename Nyad® 1250; 30.22 g of a quartz/kaolinite mixture having an average particle size of 1.8 µm, obtainable from Hoffmann & Söhne, Germany under the tradename Aktisil® EM; 0.4 g of 2-ethylimidazole; 0.2 g of γ-glycidyloxypropyltrimethoxysilane (Silane A-187 from Union Carbide); 0.4 g of carbon black (Elftex 460); 0.8 g of OP wax from Hoechst and 0.5 g of Ca stearate are compounded on a Buss-Cokneader PR 46 at a temperature of 70°–90° C. and ground to granules. From the granules, ISO dumbbell bars are produced for the physical tests and test sheets of dimensions 50×40 mm are produced in a highly polished chromium-plated mould for measurement of the gloss. The processing conditions here are: injection moulding machine Bucher TS 120, cylinder temperature=80°/60° C., mould temperature=180°/180° C. and curing time=50 seconds.

The following properties are measured on the resulting shaped articles:

Impact strength (ISO 179, method leU)=5.0 kJ/m$^2$

Temperature of deflection under load (ISO 75, method A)=175° C.

Gloss (reflection value according to DIN 67530)=82%.

What is claimed is:

1. A moulded material having a high-gloss surface comprising a cured epoxy resin composition comprising
   (a) a solid epoxy resin having on average more than one epoxide group in the molecule,
   (b) an epoxy resin curing agent in an amount sufficient for full curing of the epoxy resin,
   (c) wollastonite having a weight average particle size of less than 50 µm in an amount of 10 to 350 parts by weight per 100 parts by weight of the sum of components (a) and (b) and,
   (d) a quart/kaolinite mixture having a number average particle size of less than 50 µm in an amount of 10 to 350 parts by weight per 100 parts by weight of the sum of components (a) and (b), the content of components (c) and (d) together not being greater than 360 parts by weight.

2. A moulded article according to claim 1, which comprises a phenolic curing agent for the epoxy resin as component (b).

3. A moulded article according to claim 1, which comprises a cresol-novolak as component (b).

4. A moulded article according to claim 1, which comprises wollastonite in an amount of 50 to 200 parts by weight per 100 parts by weight of the sum of components (a) and (b).

5. A moulded article according to claim 1, which comprises wollastonite having weight average particle size of less than 5 µm.

6. A moulded article according to claim 1, which comprises a quartz/kaolinite mixture in an amount of 50 to 200 parts by weight per 100 parts by weight of the sum of components (a) and (b).

7. A moulded article according to claim 1, which comprises a quartz/kaolinite mixture which consists of 5 to 95 parts by weight of quartz and 95 to 5 parts by weight of kaolinite per 100 parts by weight of said mixture.

8. A moulded article according to claim 7, which comprises a quartz/kaolinite mixture which consists of 20 to 80 parts by weight of quartz and 80 to 20 parts by weight of kaolinite per 100 parts by weight of the mixture.

* * * * *